United States Patent [19]

Proctor et al.

[11] 4,001,512
[45] Jan. 4, 1977

[54] AUTOMATIC TELEPHONE NUMBER IDENTIFICATION CIRCUIT

[75] Inventors: Darryl F. Proctor, Redmond; Peter T. Skelly, Issaquah, both of Wash.

[73] Assignee: Proctor and Associates Company, Redmond, Wash.

[22] Filed: July 16, 1975

[21] Appl. No.: 596,397

[52] U.S. Cl. .......................... 179/17 A; 179/18 FH
[51] Int. Cl.² .................................. H04M 15/36
[58] Field of Search ........... 179/17 A, 18 FH, 17 E, 179/17 R, 84 R

[56] References Cited

UNITED STATES PATENTS

| | | | |
|---|---|---|---|
| 2,277,623 | 3/1942 | Allen | 179/17 A |
| 3,278,687 | 10/1966 | Everett | 179/17 A |
| 3,339,028 | 8/1967 | Taugner | 179/18 FH |

*Primary Examiner*—Kathleen H. Claffy
*Assistant Examiner*—Gerald L. Brigance
*Attorney, Agent, or Firm*—Christensen, O'Connor, Garrison & Havelka

[57] ABSTRACT

An identification circuit, which is useful in a communication system comprising a plurality of remote stations and one central station, for automatically distinguishing between two remote stations in the system which are common to a single communication line pair connection to the central station. A two-party telephone line in a telephone network is an example of such a system. The identification circuit includes a ground mark circuit which in turn includes sufficient dc resistance to provide an electrical imbalance on the communication line pair when the ground mark circuit is connected between the communication line pair and ground. A sensing circuit and a control circuit are also provided, with the sensing circuit being responsive to a dc current in a portion of the communication line pair connected to a selected one of the two remote stations to energize the control circuit, which is in turn operable to connect the ground mark circuit between the communication line pair and ground. The electrical imbalance thereby appearing on the communication line pair is detectable by the central station.

24 Claims, 7 Drawing Figures

AUTOMATIC TELEPHONE NUMBER IDENTIFICATION CIRCUIT

BACKGROUND OF THE INVENTION

The present invention relates generally to the telephone art, and more particularly concerns improvements in automatic number identification (ANI) systems.

In those telephone systems using central automatic switching facilities (central offices), it is often desirable that the number of the party placing a long-distance (toll) call be automatically identified, for purposes of accurate, economical billing. This is currently done for those parties which have a single party line, i.e., only one party on a single communication line pair connection to the central office, by well-known equipment which identifies the particular line pair over which the call occurs and from that identifies the calling party. However, a serious problem in the automatic identification of the calling party is presented when two parties are connected to the same communication line pair, a condition known in the telephone art as a two-party line. One conventional system used to automatically distinguish between two parties common to a single communication line pair is known in the art as resistance ground automatic number identification. In such a system, one of the parties to the two-party line has an identification circuit, which includes an element referred to in the art as a ground mark circuit, present in his telephone instrument. The other party to the two-party line either does not have such an identification circuit in his telephone instrument or, if it is present, it is disabled. The two parties thus may be distinguished from each other at the central office on the basis that one party has an enabled identification circuit in his telephone, and the other does not. The actual operation of the identification circuit will be discussed in more detail in later paragraphs.

Typically, an identification circuit is physically incorporated in each telephone manufactured, but it is not until the telephone is actually installed that the identification circuit contained therein is made operable, or alternatively, is disabled. The operational condition of the identification circuit of a given telephone will of course, be opposite to the operating condition of the identification circuit present in the telephone of the other party (if any) on the two-party line.

It is sometimes inconvenient for a telephone company, however, to enable or disable the identification circuit at the time of installation of the telephone. Additionally, when a group of existing telephones are being converted from operator number identification (ONI) to automatic number identification (ANI), burdensome problems of arranging for home visits to install identification circuits are presented. Furthermore, with the decline of telephone leasing, and with a corresponding increase in the number of telephones which are purchased and installed by subscribers, the control of a telephone company over the individual telephones in its system has significantly decreased. Not surprisingly, these problems of installation and control have caused numerous errors in proper identification of and billing of parties placing long-distance calls.

Accordingly, it is a general object of the present invention to provide an ANI identification circuit which overcomes the disadvantages of the prior art described above.

It is a further object of the present invention to provide such an identification circuit which is compatible with existing ANI equipment, and which may be installed on a subscriber's line without access to the subscriber's telephone.

It is yet another object of the present invention to provide such an identification circuit which is activated only upon lifting of the receiver of one telephone on the two-party line.

It is another object of the present invention to provide such an identification circuit which may be installed at any place on the line between a subscriber's telephone and the point of intersection with the line of the other party on the two-party line.

SUMMARY OF THE INVENTION

According to the invention, an identification circuit is provided for use with a communication system which includes a plurality of remote stations connected by pairs of communication lines to at least one central station, wherein at least one pair of communication lines is common to two remote stations by dividing into two branches at a point along the length thereof, with one branch being connected to one of said two remote stations and the other of said two branches being connected to the other of said two remote stations. Said one branch, said one remote station and said one pair of communication lines forms a first communication line loop. Said other branch, said other remote station and said one pair of communication lines forms a second communication line loop. The identification circuit includes a ground mark circuit which is operable to cause a dc current imbalance in the one pair of communication lines when it is coupled between one of the first and second communication line loops and ground. The identification circuit also includes means sensing the presence of a dc current in one of said first and second communication line loops, and further includes means for connecting the ground mark circuit between said one communication line loop and ground when a dc current is sensed in said one communication line loop.

Concerning more specifically one aspect of the invention, the ground mark circuit includes a dc resistance, and even more specifically includes a series connection of a relatively low value of dc resistance and a relatively high value of ac impedance.

DESCRIPTION OF THE DRAWINGS

A more thorough understanding of the invention may be obtained by a study of the following detailed description taken in connection with the accompanying drawings in which.

DESCRIPTION OF THE PREFERRED EMBODIMENT

Figure 1:
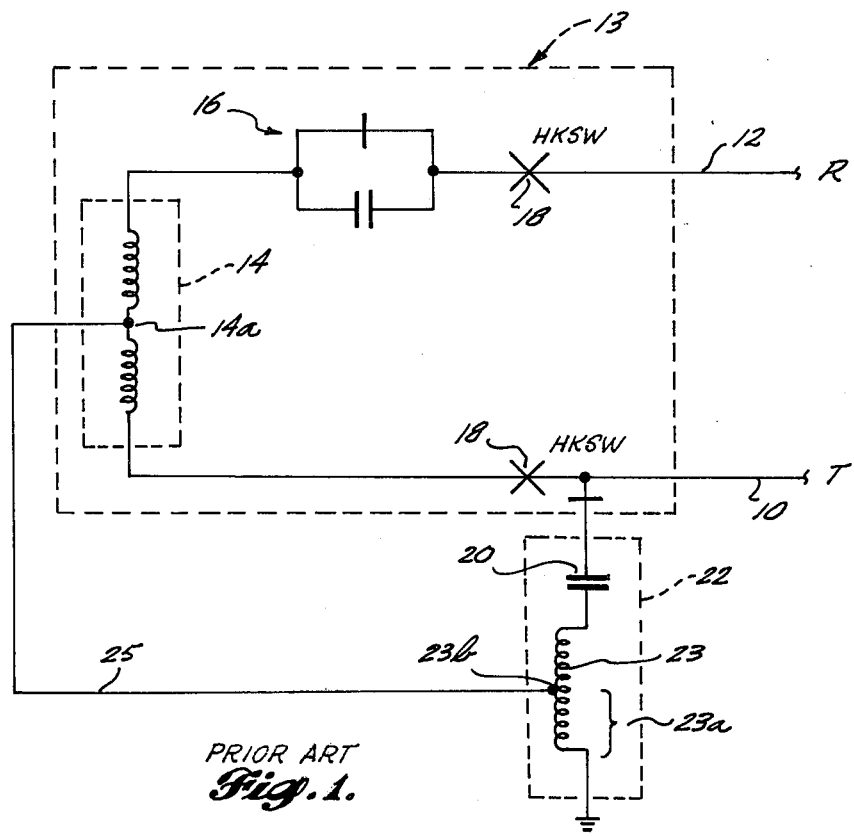
FIG. 1 is a block diagram of a prior art resistance ground ANI identification circuit, shown for purposes of explanation, and shown in conjunction with a telephone.

Referring now to FIG. 1, one type of identification circuit known in the prior art is shown in its telephone environment and is illustrated for purposes of clarifying generally the function of an identification circuit and the problems solved by the present invention. Referring to FIG. 1, tip and ring lines 10 and 12 lead from a central office (not shown) to a telephone 13, which is shown partially in block diagram form and partially in schematic form. A telephone transmission network 14 represents the circuit elements in the telephone other than a dial mechanism 16, a mechanical hook switch 18, and a handset, not illustrated. The mechanical hook switch 18 is in an open position when the handset is on hook, thereby preventing electrical contact between telephone network 14 and tip and ring lines 10 and 12. When the handset is lifted off hook, however, hook switch 18 closes, resulting in a completed circuit between ring line 12 and tip line 10 through dial mechanism 16 and telephone transmission network 14.

A ringer circuit 22 is connected between tip line 10 and ground. Ringer circuit 22 includes a series connection of a capacitor 20 and a ringer coil 23. Capacitor 20 is connected to tip line 10 through a break contact of hook switch 18. Conventionally, circuit 22 passes the 85 vac ringing voltage to ground from the central office when telephone 13 is being called, and the handset of telephone 13 is on-hook. The 85 vac signal activates the ringer circuit 22 until the handset is lifted. The ringer coil 23 is shown schematically as an inductance, but also includes several kilohms of dc resistance. Connecting a tap 23b of ringer coil 23 to the impedance midpoint 14a of telephone transmission network 14 is connection line 25.

Nominally, 48 volts dc is maintained between tip and ring lines 10 and 12 by the central office. When the handset of telephone 13 is on-hook, however, there is no dc current path between tip and ring lines 10 and 12 because hook switch 18 is open, and furthermore, there is no dc current path between tip line 10 and ground because of capacitor 20. However, when the handset of telephone 13 is lifted, closing hook switch 18, the impedance midpoint 14a of telephone transmission network 14 is connected to ground through a portion 23a of ringer coil 23. Portion 23a of ringer coil 23 between tap 23b and ground is known as a ground mark circuit.

Typically, the ground mark circuit includes a dc resistance of sufficient value so as to provide an imbalanced condition between tip and ring lines 10 and 12, which in turn is detectable by the central office. Typically, the value of the dc resistance in the ground mark circuit is between 1 and 3 kilohms. Preferably, the ground mark circuit will include a large value of ac impedance usually in the form of an inductance, which functions to minimize the unbalancing effect, for ac currents, of the dc path to ground provided by the dc resistance of the ground mark circuit. This minimizes the conversion of common mode noise, which is noise present equally on both tip and ring lines and thus not heard on the lines, into normal mode noise, which is noise present between the tip and ring lines, and which is heard on the lines. The ac impedance of the ground mark circuit is typically quite large, and preferably is on the order of 100 kilohms in the voice frequency band. Thus, preferably, the ground mark circuit will be a series connection of a relatively low value of dc resistance, providing a sufficiently unbalanced condition on the lines to be detectable by the central office, and a relatively large value of ac impedance, sufficient to minimize the presence of normal mode noise which is heard on the lines.

The dc current imbalance resulting when the ground mark circuit is connected between impedance midpoint 14a of telephone transmission network 14 and ground can be detected by the central office so that if one subscriber has the ground mark circuit while the other subscriber on a two-party line does not, they can be distinguished from each other. Thus, if the central office sees a current imbalance on the line, it knows to bill one of the two parties, and if no current imbalance is seen, the other party is billed. The equipment in the central office for detecting such an imbalance is conventional and is thus not described in detail in this application.

As described above, however, such a ground mark circuit which forms a part of the ringer coil 23 present in the subscriber's telephone presents problems of installation and control. These problems are overcome by the circuit of the present invention, which may be installed on a subscriber's line without access to his telephone instrument.

Figure 2:
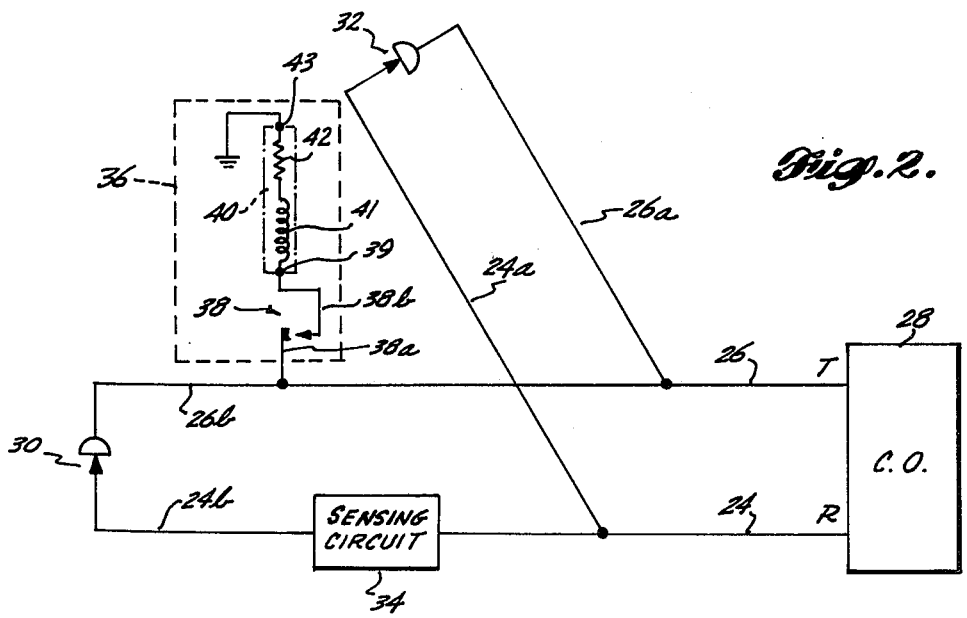
FIG. 2 is a simplified block diagram illustrating the identification circuit of the present invention, and its connection in the environment of a two-party line.

Referring now to FIG. 2, a first embodiment of the identification circuit of the present invention is shown, wherein tip (T) and ring (R) lines 26 and 24, respectively, are shown leading from a central office 28, and are shown being common to two telephones 30 and 32, thus illustrating a two-party telephone connection. Branch lines 24a and 26a connect telephone 32 to ring and tip lines 24 and 26, respectively, thereby forming a first communication line loop which comprises in series ring line 24, branch line 24a, telephone 32, branch line 26a and tip line 26, while branch lines 24b and 26b connect telephone 30 to ring and tip lines 24 and 26, respectively, forming a second communication line loop, which comprises in series ring line 24, branch line 24b, telephone 30, branch line 26b and tip line 26.

Conventionally, central office 28 maintains a potential of 48 vdc between ring and tip lines 24 and 26. Tip line 26 will typically be at ground potential and ring line 24 at −48 volts. Since branch lines 24a, 26a and 24b, 26b are connected as described above to ring and tip lines 24 and 26, a potential of 48 vdc is also present between branch lines 24a and 26a, and between branch lines 24b and 26b. A dc current thus flows in the first communication line loop when the handset of telephone 32 is lifted, closing its hook switch, and in the second communication line loop when the handset of telephone 30 is lifted, closing its hook switch.

Each telephone 30 and 32 also includes a ringer circuit similar to that shown in FIG. 1, which ringer circuit passes ac ringing current to ground when the telephone handset is on-hook. As explained above with reference to FIG. 1, 85 vac ringing voltage is applied by central office 28 over either ring line 24 or tip line 26, depending on which party on the two-party line is being called. Ringing voltage is terminated by the central office 28 when the called party lifts the handset of his telephone.

However, the ringing circuits in telephones 30 and 32 (FIG. 2) are not connected in such a way as to function also as ground mark circuits, as was true with the prior art circuit of FIG. 1. For example, the lead 25 in FIG. 1 may be eliminated. A ground mark circuit 36 is, however, provided which is located outside the physical confines of telephone 30, such as at a point along branch line 26b, as shown in FIG. 2. When ground mark circuit 36 is positioned outside telephone 30, the telephone's hook switch can no longer provide the required selective coupling function for the ground mark circuit between one (e.g. the second) communication line loop and ground. In order to permit the ground mark circuit to be so positioned, the lifting of the handset of the telephone in the second communication line loop (and hence the closing of the associated hook switch) must be sensed independently. This is accomplished by a circuit which is capable of sensing dc current in the second communication line loop. The presence of dc loop current, of course, is a reliable indication that the receiver of the party in the second communication line loop has lifted his receiver and hence is about to make a call. Thus, when dc current in the second communication line loop is sensed, the ground mark circuit is coupled to the second communication line loop, and a dc current imbalance results. This condition is sensed by the central office, and it knows that party two on the second communication line pair is making a call. When party one, on the first communication line loop, lifts his handset to make a call, the central office sees no current imbalance, since the ground mark circuit is not connected, and thus, the central office knows party one is making the call. The parties are then billed accordingly.

Referring to FIG. 2, sensing circuit 34 is connected in branch line 24b of the second communication line loop and functions to recognize dc current in the second communication line loop. In some embodiments, sensing circuit 34 is capable of distinguishing the dc current generated by the 48 vdc from the ac current generated by the 85 vac ringing voltage. When sensing circuit 34 senses the presence of a dc current in the second communication line loop, a control circuit, which may form an integral part of sensing circuit 34, is energized, and functions to connect ground mark circuit 36 between ground and branch line 26b. In some embodiments of sensing circuit 34, the control circuit is energized only in response to a dc current in the second communication line loop. Thus, if sensing circuit 34 senses the presence of an ac current in the second communication line loop, the control circuit is not energized, and ground mark circuit 36 remains disconnected from between branch line 26b and ground.

In one embodiment of the present invention, sensing circuit 34 is a relay, which operates to activate a relay contact set 38 when a dc current is detected, one contact 38a of which is connected to branch line 26b and the other contact 38b of which is connected to one end 39 of inductor 40, which is represented schematically as a series connection of an inductance 41 and a dc resistance 42. The other end 43 of inductor 40 is connected to ground. Preferably, the value of dc resistance 42 will be small enough that the resulting signal imbalance on the communication line pair will be reliably detectable. Typically the value of dc impedance will between 1 and 3 kilohms. The ac resistance of inductor 40 will be high, preferably approximately 100 kilohms in the voice frequency band.

In operation, when relay contacts 38a and 38b close, branch line 26b is coupled through relay contact set 38 and inductor 40 to ground, thereby establishing an unbalanced dc current condition in the second communication line loop, which condition can be identified by central office 28. In practice, sensing circuit 34 and ground mark circuit 36 comprise the identification circuit and may be conveniently arranged in a single package, which may be connected across branch lines 24b and 26b associated with telephone 30 at any point from telephone 30 to the intersection of branch lines 24b and 26b with branch lines 24a and 26a.

Figure 3:
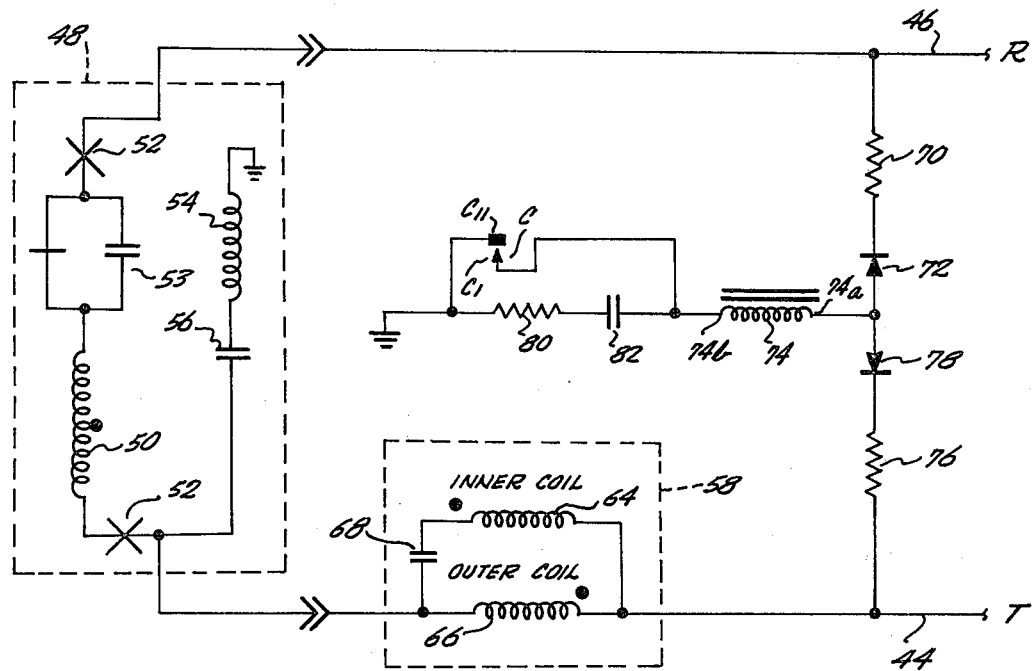
FIG. 3 is a schematic diagram of the identification circuit shown in block form in FIG. 2.
Figure 4:
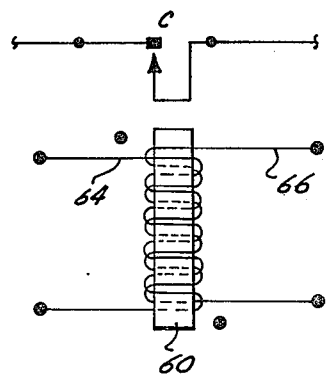
FIG. 4 is a diagrammatic representation of the relay circuit used in the schematic circuit of FIG. 3.
Figure 5:
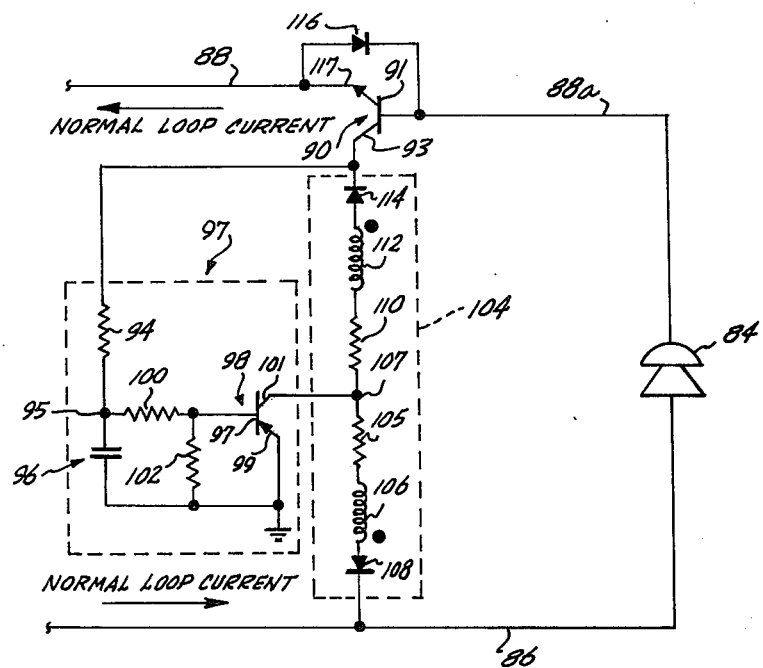
FIG. 5 is a schematic diagram of a solid state embodiment of the identification circuit of the present invention.
Figure 6:
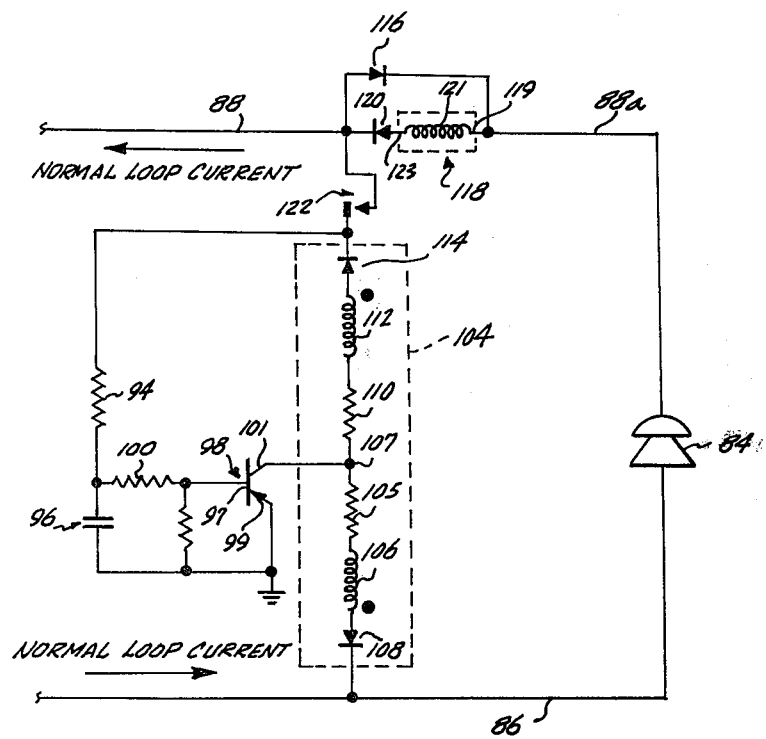
FIG. 6 is a schematic diagram of another solid state embodiment similar in function to the circuit shown in FIG. 5.
Figure 7:
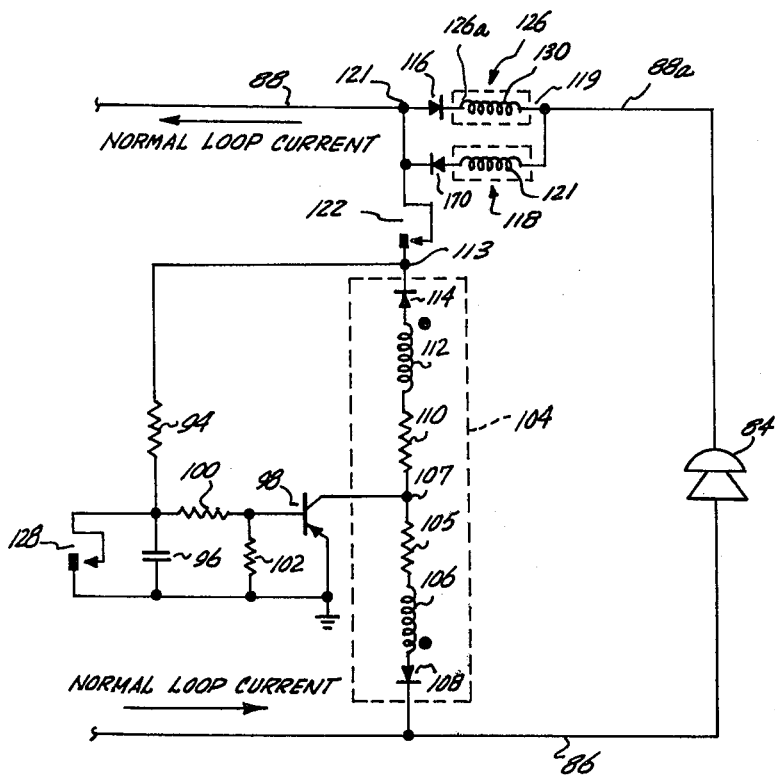
FIG. 7 is a schematic diagram of yet another solid state embodiment similar in function to the circuits of FIGS. 5 and 6.

Referring now to FIGS. 3 and 4, which show in more detail one embodiment of the identification circuit of the present invention, tip and ring lines 44 and 46, respectively, lead from a central office (not shown) to a telephone represented generally at 48. It should be remembered that the circuit of FIG. 3 and those of other embodiments shown in FIGS. 5, 6 and 7 is that of one party on a two-party line. The one telephone actually shown is that party (previously identified as "party two") having the functioning identification circuit.

As noted above, the identification circuit of the present invention may be connected to tip and ring lines 44 and 46 at any point therealong from the telephone 48 to the point of intersection with the lines from the telephone of the other party on the two-party line. Telephone 48 includes a telephone transmission network 50, similar to that shown as telephone transmission network 14 in FIG. 1, a hook switch 52, and a dial mechanism 53. The connection of telephone transmission network 50 to lines 44 and 46 is conventionally controlled by hook switch 52, with the telephone transmission network 50 being connected to lines 44, 46 when handset of telephone 48 is off hook and hook switch 52 thereby closed. Conversely, telephone transmission network 50 is disconnected from lines 44 and 46 when the handset of telephone 48 is on-hook, and hook switch 52 thereby open. Inductance 54 represents the telephone ringer circuit, and a capacitor 56 is conventionally provided in series connection between inductance 54 and line 44 to provide an ac current path to ground for activation of the ringer circuit 54 by the 85 vac ringing voltage from the central office.

As explained above, tip line 44 will ordinarily be at ground potential, and ring line 46 at −48 vdc, when the handset of telephone 48 is on-hook. When the handset is lifted, however, hook switch 52 closes, establishing a dc current path between lines 44 and 46 through telephone transmission network 50 and dial mechanism 53. When dc current flows in the communication line loop formed by line 44, dial mechanism 53, telephone transmission network 50, hook switch 52 and line 46, both lines 44 and 46 tend to go toward a potential of −24 volts.

A sensing relay, in the form of reed relay 58, is connected in series with line 44 and is shown in more detail in FIG. 4. Referring to FIG. 4, reed relay 58 includes a first relay core 60. An inner coil 64 and an outer coil 66 are wound around the first relay core 60 in opposition to one another, so that a magnetic field established by a current in one coil will tend to oppose a magnetic field established by the current in the same direction in the other coil. Inner coil 64 is connected in series with a capacitor 68 across outer coil 66. A contact set c is provided which is normally open and which closes when current flows in either outer coil 66 or inner coil 64, but which remains open when current flows in the same direction in both coils 66 and 64.

Referring again to FIG. 3, when only a dc current flows in the communication line loop formed of line 44, dial mechanism 53, telephone transmission network 50, hook switch 52 and line 46, a dc current flows through outer coil 66, while dc current does not flow in inner coil 64 because of capacitor 68. In such a case, contact set $c$ of reed relay 58 will close, thereby providing a dc current path from both lines 44 and 46 to ground. The dc current path from line 46 is a series connection of resistance 70, diode 72, inductor 74, and relay contact set $c$ to ground, while the dc current path from line 44 is a series connection of resistance 76, diode 78, inductor 74 and relay contact set $c$ to ground. Inductor 74 and either of or both resistances 70 and 76 form the ground mark circuit of the embodiment of FIG. 3.

Resistances 70 and 76 and diodes 72 and 78 form a series connection between lines 44 and 46, with resistances 70 and 76 being substantially equal in value and diodes 72 and 78 being connected in opposition to prevent any direct current flow between lines 44 and 46. One end 74$a$ of inductor 74 is connected to the commonly connected anodes of diodes 72 and 78 while the other end 74$b$ of inductor 74 is connected to one side $c_1$ of relay contact set $c$ while the other side $c_{11}$ of relay contact set $c$ is connected to ground. Connected across relay contact set $c$ is a series connection of resistance 80 and capacitor 82, which series connection forms a conventional protection circuit to prevent current arcing across the relay contact set $c$.

As stated above, the series connection of resistance 70 and diode 72 form a dc current path between line 46 and side 74$a$ of inductor 74, while the series connection of resistance 76 and diode 78 form a dc current path between line 44 and side 74$a$ of inductor 74. Since lines 44 and 46 will go to some value of negative potential, typically −24 volts, when hook switch 52 is closed, dc current will flow both from lines 44 and 46 through inductor 74 to ground when relay contact set $c$ is closed.

The advantage of the embodiment in FIG. 3 over that in FIG. 2 is that a balanced transmission circuit is used in the former to avoid an ac unbalance in the lines 44, 46 which would cause noise objectionable to the subscriber.

In the embodiment shown in FIG. 3, a connection of a ground mark circuit (e.g. inductor 74 and either one of resistances 70 or 76) between one or both of lines 44 and 46 occurs only when dc current alone is flowing in the communication line loop, which is caused by the handset of telephone 48 being lifted off hook. The presence of ac current in the communication line loop will not result in the ground mark circuit being connected between lines 44 and 46 and ground. If an ac current such as that provided as a result of ringing voltage, were effective, for instance, to operate relay contact set $c$, a dc current path (to ground) would be provided in telephone 48, and this condition might make it appear to the central office that the handset of the telephone had been lifted, even though it actually had not, and hence, the ringing voltage will be prematurely and erroneously terminated by the central office.

The configuration of reed relay 58, however, prevents contact set $c$ from operating in response to ac current. In operation, when ac ringing voltage is applied on line 44 by the central office, the resulting ac current will flow through inner coil 64 and capacitor 68 of reed relay 58, as well as outer coil 66, since the ac resistance of a capacitor is negligible. The flow of ac current through outer coil 66 and inner coil 64 will result in cancellation of their magnetic fields in first relay core 60, and thus maintaining contact set $c$ open. Hence, the ground mark circuit of FIG. 3 will be effectively connected between lines 44 and/or 46 and ground only when a dc current alone is flowing in the communication line loop.

FIGS. 5, 6 and 7 disclose additional embodiments of the identification circuit of the present invention. Each additional embodiment, however, like the embodiment shown in FIGS. 3 and 4, includes at least a sensing circuit for detecting the presence of a dc current in a communication line loop, a ground mark circuit, and a control circuit which is operable to connect the ground mark circuit between either or both of the lines in the communication line loop and ground when a dc current is detected. Each of the embodiments of FIGS. 5, 6 and 7 are shown, as was FIG. 3, without connections to a central office or with the other party, for purposes of convenience of illustration. Connected in series with line 88 is an NPN transistor 90, having a base 91 connected to the telephone 84 through line portion 88$a$. Emitter 117 is connected to line 88, which in turn leads to the central office (not shown). Connected between base 91 and emitter 117 is a diode 116, having a cathode connected to base 91 and an anode connected to emitter 117.

A ground mark circuit 104 is connected between the collector 93 of transistor 90, and line 86. Ground mark circuit 104 is comprised of two identical circuit branches having a common junction at circuit midpoint 107. Connected between collector 93 of transistor 90 and circuit midpoint 107 is a series connecton of diode 114, inductance 112, and resistance 110. Connected betweeen line 86 and circuit midpoint 107 is a series connection of diode 108, inductance 106, and resistance 105. In one embodiment, inductances 106 and 112 are transformer windings.

A control circuit 97 is connected between collector 93 of transistor 90, circuit midpoint 107, and ground, and functions to connect ground mark circuit 104 to ground when transistor 90 turns on. Control circuit 97 includes a series connection of a resistance 94 and capacitor 96 connected between collector 93 of transistor 90 and ground. A PNP transistor 98 is provided in control circuit 97, and includes a collector 101 which is connected to circuit midpoint 107, an emitter 99 which is connected to ground, and a base 97 which is connected through a resistance 100 to a junction point 95 between resistance 94 and capacitor 96. A resistance 102, which is connected between base 97 of transistor 98 and ground, completes control circuit 97.

In operation, when the handset in telephone 84 is lifted off hook, dc current flows in through line 86, and then through telephone 84, line 88$a$ and transistor 90. When current flows into base 91 of transistor 90, transistor 90 turns on, which in turn results in a current flow from its collector 93 through resistance 94 into capacitor 96, charging it. The dc current is prevented from flowing between lines 86 and 88 through ground mark circuit 104 because diodes 108 and 114 are connected in opposition to each other. As capacitor 96 is charged by the collector current from transistor 90, current also flows into the base 97 of transistor 98 through resistance 100. The combination of resistance 100 and 102 acts as a voltage divider, with the potential at the base 97 of transistor 98 being dependent upon the relative values of resistances 100 and 102, respectively.

Transistor 98 turns on in response to current flowing into its base 97, thereby providing a current path between circuit midpoint 107 and ground through its collector-emitter path. Capacitor 96 is sufficiently large to maintain a sufficient charge during the dialing of telephone 48 to keep transistor 98 turned on during the break portion of the dialing sequence. This is important if the central office looks at the communication line pair during the make/break sequence of dialing to determine the existence of the current imbalance. In typical telephone installations, transistor 98 is kept on over a range of 5–25 pulses per second, with each pulse having a duty cycle of between 50%–80% break. Thus, when transistor 98 turns on, line 86 will be coupled to ground through the series connection of diode 108, inductance 106, resistance 105 and the collector-emitter path of transistor 98, while line 88 is coupled to ground through the emitter-collector path of transistor 90, diode 114, inductance 112, resistance 110, and the collector-emitter path of transistor 98.

Diode 116 functions to bypass transistor 90 for current flowing into telephone 84 from line 88, and thus functions to provide a low impedance path from the base 91 to the emitter 117 of the transistor 90 when the polarity of the dc current in the communication line loop is reversed. When the polarity of dc current reverses, such as occurs after a call is answered, the bypassing of transistor 90 by diode 116 will result in transistor 98 turning off due to lack of base drive.

FIG. 6 illustrates another embodiment of the identification circuit of the present invention which is similar in structure and function to the circuit shown in FIG. 5, with the exception that a series connection of relay 118 and diode 120 is substituted for transistor 90. Portion 88a of line 88 connects telephone 84 to one end 119 of relay coil 121. End 119 of relay coil 121 is in common connection with the cathode of diode 116, while the other end 123 of relay coil 121 is in common connection with the anode of diode 120. The cathode of diode 120 and the anode of diode 116 are in turn commonly connected to line 88 which leads to the central office (not shown). Relay contact set 122 is connected between the common connection of the cathode of diode 120 and the cathode of diode 116, and the junction point 113 common to resistance 94 and diode 114.

The operation of the circuit of FIG. 6 is similar to that of the circuit shown in FIG. 5. When dc current flows in through line 86, through portion 88a of line 88, and then through relay coil 121 and diode 120, relay contact set 122 closes, and a dc current is provided through resistance 94 into capacitor 96, charging capacitor 96. When capacitor 96 is charged, transistor 98 will turn on, permitting current to flow from ground through the emitter-collector path of transistor 98 through the ground mark circuit 104 to lines 86 and 88, thereby creating the imbalanced condition in the communication line loop, as occurs in the circuit of FIG. 5.

FIG. 7 shows another embodiment of the identification circuit of the present invention, again similar in structure and operation to the circuits shown in FIGS. 5 and 6, but which includes circuit protection against ringing voltage 85 vac causing ground circuit 104 to be connected to ground. A series circuit of a relay 126 and diode 116 is connected in parallel with the series circuit of relay 118 and diode 120. Portion 88a is connected between telephone 84 and a circuit junction point 119 common to one end of relays 118 and 126. Line 88 is connected to a circuit junction point 121 between diodes 116 and 120, and leads to the central office (not shown). One end 126a of relay coil 130 of relay 126 is connected to the cathode of diode 116, with the anode of diode 116 being connected to the cathode of diode 120 at circuit junction point 121. Relay contact set 122, which is energized as stated previously with respect to the circuit of FIG. 6 when current flows through relay coil 121, is connected between circuit junction point 121 and circuit junction point 113. Relay contact set 128, on the other hand, which is associated with relay 126, is connected in parallel with capacitor 96, and is energized when current flows through relay coil 130.

The operation of the circuit of FIG. 7 is identical to that of the circuit of FIG. 6 in response to a dc current flowing in the communication line loop formed by line 86, telephone 84, portion 88a, relay coil 118 and diode 120. Briefly, dc current flowing in from line 86 through telephone 84 and then through relay coil 121 will result in the energizing of relay contact set 122, which in turn permits current to flow through resistance 94 into capacitor 96, thereby charging it. The charge on capacitor 96, as with the circuit of FIGS. 5 and 6, turns on transistor 98 through resistance 100, resulting in circuit midpoint 107 being connected to ground through the collector-emitter junction of transistor 98.

When 85 vac ringing voltage is present in the communication line loop, however, current is provided through diode 116 and relay coil 130 on alternate half cycles of the ringing voltage signal, which results in relay contact set 128 being energized, and which in turn results in the discharging of capacitor 96 as fast as it can be charged by the action of relay 118 on the other half cycle of the signal. Thus, transistor 98 cannot be turned on and kept on since capacitor 96 is not charged for a sufficient time to provide the necessary base current to keep transistor 98 turned on.

Ground mark circuit 104 is thus prevented from being coupled to ground through the collector-emitter junction of transistor 98 when 85 vac ringing voltage is present on lines 86 or 88. It should be understood, however, that other circuit elements may be used to accomplish this function of relay 126. For instance, a light-emitting diode (LED) may be substituted for the relay coil 130, and an associated photo-transistor may be connected in place of relay contact set 128 across capacitor 96. The LED is connected so that it will conduct current in the opposite direction to that conducted by diode 120. In operation, the photo-transistor will turn on and discharge capacitor 96 whenever current flows through the LED.

Although the circuits shown in FIGS. 3, 5, 6 and 7 have different circuit elements, it should be noted that all of the circuits so disclosed are similar on a functional block diagram level. For instance, each embodiment includes a circuit for sensing the presence of dc current in the communication line loop formed by the lines from the central office and the telephone associated with the identification circuit, and it should be understood that the sensing circuit may take diverse forms within the spirit of the invention. Furthermore, each embodiment includes a ground mark circuit, and further includes a circuit which is responsive to the sensing circuit to couple the ground mark circuit between one or both of the communication lines and ground.

Additionally, in several of the embodiments, circuit protection is provided against the possibility of ac current, resulting from ac ringing voltage (conventionally 85 vac) causing the ground mark circuit to be coupled to the ground, while still other embodiments have the circuit feature which maintains the connection of the ground mark circuit to ground during dialing of the telephone.

It should also be noted that other changes, modifications, and substitutions may be made without departing from the spirit of the invention, which is defined by the claims which follow:

What is claimed is:

1. An identification circuit for use with automatic number identification apparatus in a communication system which includes a central office and a plurality of remote stations, each of said remote stations being connected to said central office by a communication line pair, at least one communication line pair in said communication system being common to first and second remote stations, said one communication line pair being split at a point along the length thereof into first and second branches, said first branch being connected to said first remote station, said first branch, said first remote station and said one communication line pair forming a first communication line loop, said second branch being connected to said second remote station, said second branch, said second remote station and said one communication line pair forming a second communication line loop, said identification circuit comprising:

signal sensing means for detecting the presence of a dc loop current in said second communication line loop, and providing an output in response thereto;

circuit means operative to cause a signal imbalance on said one communication line pair when said circuit means is connected to said second communication line loop; and, means responsive to said output from said signal sensing means for connecting said circuit means to said second communication line loop.

2. An identification circuit of claim 1, wherein said signal sensing means is adapted to be connected in said second branch.

3. An identification circuit of claim 1, wherein said circuit means is connected between said second communication line loop and ground when said circuit means is operative to cause a signal imbalance on said one communication line pair.

4. An identification circuit of claim 1, wherein said circuit means includes a dc resistance means of sufficient value such that said signal imbalance on said one communication line pair is reliably detectable from normal current imbalances present on said one communication line pair.

5. An identification circuit of claim 4, wherein the value of said dc resistance means is within the range of 1 Kilohm to 3 Kilohms, inclusive.

6. An identification circuit of claim 4, wherein said circuit means includes an ac impedance means connected in series with said dc resistance means, said ac impedance means having a value of impedance which is relatively large in the voice frequency band compared to the value of said dc resistance.

7. An identification circuit of claim 6, wherein said circuit means includes an inductance means.

8. An identification circuit of claim 6, wherein the value of said ac impedance is on the order of at least 100 Kohms in the voice frequency band.

9. An identification circuit of claim 4, wherein said circuit means includes in series connection, means coupling one communication line in said one communication line pair to said dc resistance means, ac impedance means connected to said dc resistance means, and means controlled by said connecting means for coupling said ac impedance means to ground.

10. An identification circuit of claim 1, wherein said circuit means includes: a first circuit section comprising in series connection a first dc resistance means, a first ac impedance means, a first diode and means coupling said first circuit section to one communication line in said one communication line pair; a second circuit section comprising in series connection a second dc resistance means, a second ac impedance means and a second diode, and means coupling said second circuit section to said other communication line in said one communication line pair; means applying said first and second circuit sections together in series between said one and said other communication lines, with said first and second diodes being connected in opposition to each other; and means coupling said applying means to ground.

11. An identification circuit of claim 1, wherein said signal sensing means includes means for discriminating between ac current and dc current, and wherein said signal sensing means provides said output only upon the presence of dc current alone in said second communication line loop.

12. An identification circuit of claim 3, wherein said signal sensing means and said connecting means includes a relay having a coil connected in series with said second communication line loop and a relay contact set connected in series with said circuit means between said second communication line loop and ground, said relay contact set being normally open and being closed in response to the presence of dc current in said second communication line loop, thereby coupling said circuit means between said second communication line loop and ground.

13. An apparatus of claim 12, wherein said relay has a core and first and second relay coils wound on said core in opposition to each other, and further including a capacitor connected in series with one of said coils, said one relay coil and said capacitor being connected in parallel with the other of said relay coils so that the presence of a dc current in said second communication line loop causes said relay contact set to close and the presence of an ac current in said second communication line loop maintains said relay contact set open.

14. An apparatus of claim 13, wherein said relay is a reed relay.

15. An identification circuit of claim 3, wherein said circuit means has two ends, wherein said identification circuit includes means coupling one end of said circuit means to said second communication line loop, and wherein said connecting means includes control means coupling the other end of said circuit means to ground, said control means having two operative conditions, one condition thereof providing a dc current path between ground and said other end of said circuit means, the other condition thereof providing an open circuit dc current path between ground and said other end of said circuit means, and wherein said control means is nominally in said second operative condition.

16. An identification circuit of claim 15, including energizing means responsive to said output from said signal sensing means for changing said control means from said second operative condition to said first operative condition.

17. An identification circuit of claim 16, wherein said control means includes a transistor and said dc current path is the collector-emitter junction of said transistor.

18. An identification circuit of claim 17, wherein said energizing means includes a capacitor and means connecting said capacitor to the base of said transistor, said capacitor charging in response to said output from said signal sensing means to provide base drive to maintain said transistor conductive during momentary interruptions of dc current in said second communication line loop.

19. An identification circuit of claim 16, wherein said signal sensing means includes means responsive to a dc current in said second communication line loop to connect said energizing means to said one communication line.

20. An identification circuit of claim 1, wherein said connecting means includes means for maintaining said circuit means connected to said second communication line loop when pulsating dc is present in said second communication line loop.

21. An identification circuit of claim 19, including unidirectional current means connected in parallel with said signal sensing means, such that, in response to dc current of one polarity in said second communication line loop, said control means changes from said second operative condition to said first operative condition, and such that in response to dc current of opposite polarity in said second communication line loop, said control means goes to said second operative condition.

22. An identification circuit of claim 16, wherein said sensing means includes a transistor having a base-emitter path in series with said second communication line loop and includes means connecting said one end of said circuit means and said energizing means to the collector of said transistor.

23. An identification circuit of claim 16, wherein said signal sensing means includes a first series connection of a first diode and a first relay coil connected in series with said second communication line loop, and further includes a first relay contact set associated with said first relay coil and connected between said second communication line loop and a common connection of said one end of said circuit means and said energizing means, said first relay contact set closing in response to current passing through said first relay coil.

24. An identification circuit of claim 23, including a second series connection of a second diode and a second relay coil, said second series connection being connected in parallel with said first series connection, with said second diode permitting current flow in a direction opposite to that of said first diode, and a second relay contact set associated with said second relay coil and connected across said energizing means, said second relay contact set closing and disabling said energizing means when current flows through said second relay coil.

* * * * *